US012688758B2

(12) United States Patent
Otomo

(10) Patent No.: US 12,688,758 B2
(45) Date of Patent: Jul. 21, 2026

(54) RECORDING MEDIUM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 204 days.

(21) Appl. No.: 18/664,541

(22) Filed: May 15, 2024

(65) Prior Publication Data

US 2024/0296720 A1 Sep. 5, 2024

Related U.S. Application Data

(63) Continuation of application No. PCT/JP2022/041621, filed on Nov. 8, 2022.

(30) Foreign Application Priority Data

Nov. 15, 2021 (JP) ................................ 2021-185560

(51) Int. Cl.
*G07F 17/00* (2006.01)
*G07F 17/32* (2006.01)

(52) U.S. Cl.
CPC .................................. *G07F 17/329* (2013.01)

(58) Field of Classification Search
None
See application file for complete search history.

(56) References Cited

U.S. PATENT DOCUMENTS

| | | | | |
|---|---|---|---|---|
| 7,086,947 | B2 * | 8/2006 | Walker | G07F 17/3251 463/16 |
| 9,319,373 | B1 * | 4/2016 | Kerr | G06Q 20/102 |
| 9,636,584 | B2 * | 5/2017 | Lam | A63F 13/533 |
| 9,744,445 | B1 * | 8/2017 | Pieron | A63F 13/79 |
| 9,799,163 | B1 * | 10/2017 | Kim | G07F 17/3267 |
| 10,286,324 | B1 * | 5/2019 | McLellan | A63F 13/85 |
| 2003/0003983 | A1 * | 1/2003 | Walker | G06Q 30/0209 463/16 |

(Continued)

FOREIGN PATENT DOCUMENTS

| | | | |
|---|---|---|---|
| JP | 6154429 | B2 * | 6/2017 |
| JP | 2018-57457 | A | 4/2018 |
| JP | 6614376 | B1 | 12/2019 |

OTHER PUBLICATIONS

Notice of Reasons for Refusal issued in corresponding Japanese Application No. 2021-185560 mailed Apr. 19, 2022 (6 pages).

(Continued)

*Primary Examiner* — Paul A D'Agostino
(74) *Attorney, Agent, or Firm* — Osha Bergman Watanabe & Burton LLP

(57) ABSTRACT

A non-transitory computer readable recording medium stores instructions for a computer that executes a lottery game in which a player can acquire and consume currency items and obtain a content drawn from a lottery target content group, the instructions causing the computer to execute: storing, in a storage, an acquisition time at which the player acquired a currency item; consuming at least one currency item possessed by the player in response to a request to execute the lottery game, and giving benefit in execution of the lottery game based on the acquisition time of the at least one currency item.

12 Claims, 10 Drawing Sheets

(56) References Cited

U.S. PATENT DOCUMENTS

| | | | | |
|---|---|---|---|---|
| 2006/0089874 | A1* | 4/2006 | Newman | G06Q 10/10 705/14.32 |
| 2008/0004116 | A1* | 1/2008 | Van Luchene | G07F 17/32 463/42 |
| 2011/0312423 | A1* | 12/2011 | Mosites | G06Q 30/0209 463/42 |
| 2012/0272278 | A1* | 10/2012 | Bedi | H04N 21/25435 725/105 |
| 2013/0252693 | A1* | 9/2013 | Arnone | G07F 17/326 463/17 |
| 2014/0141869 | A1* | 5/2014 | Shore | G07F 17/3255 463/25 |
| 2014/0274359 | A1* | 9/2014 | Helava | A63F 13/35 463/29 |
| 2015/0141118 | A1* | 5/2015 | Lefebvre | G07F 17/3255 463/22 |
| 2015/0243122 | A1* | 8/2015 | Saffari | G07F 17/3225 463/17 |
| 2015/0347994 | A1* | 12/2015 | Nakamura | G07F 17/3244 705/39 |
| 2016/0030847 | A1* | 2/2016 | Odate | A63F 13/58 463/31 |
| 2016/0104346 | A1* | 4/2016 | Ovalle | G07F 17/3223 463/17 |
| 2017/0323526 | A1* | 11/2017 | Boothe | G06Q 30/00 |
| 2018/0096317 | A1* | 4/2018 | Oochi | G06Q 30/0209 |

OTHER PUBLICATIONS

International Search Report issued in corresponding International Application No. PCT/JP2022/041621 mailed Jan. 17, 2023 (5 pages).

Written Opinion issued in corresponding International Application No. PCT/JP2022/041621 mailed Jan. 17, 2023 (3 pages).

* cited by examiner

RECORDING MEDIUM AND INFORMATION PROCESSING DEVICE

BACKGROUND

Technical Field

The present invention relates to a recording medium storing instructions and an information processing device.

Description of Related Art

There are conventional games that allow a player to acquire currency items (such as paid or charged items or unpaid or free items) that can be consumed in lottery games, for the restoration of the current stamina value, and so forth.

In this regard, Patent Literature 1 discloses a technique in which a player is allowed to obtain paid items through a purchase procedure, and which allows the player to obtain free items by logging in to a game, clearing a quest, completing a mission, etc.

PATENT LITERATURE

Patent Literature 1: Japanese Patent No. 6614376

Technological Problem to be Solved by the Invention

In such gaming technology, all currency items have the same value regardless of when they were acquired by the player (acquisition time), which means that there is no benefit to the player for holding currency items over a long period of time, or for consuming the items sooner. Accordingly, there has been a demand to enable giving benefits or advantages in game operations depending on the acquisition time of the currency item such that the player would be sufficiently motivated to acquire the currency item.

SUMMARY

One or more embodiments of the present invention provide a technological improvement over such conventional gaming technologies discussed above. In particular, one or more embodiments of the present invention provide an information processing device and a recording medium storing instructions that enable giving benefits or advantages in game operations depending on the acquisition time of the currency item such that a player can be sufficiently motivated to acquire the currency item.

According to a first mode of the present invention, a non-transitory computer readable recording medium stores instructions for a computer that executes a lottery game in which a player can acquire and consume currency items and obtain a content drawn from a lottery target content group, the instructions causing the computer to execute: storing, in a storage, an acquisition time at which the player acquired a currency item; consuming at least one currency item possessed by the player in response to a request to execute the lottery game; and giving benefit in execution of the lottery game based on the acquisition time of the at least one currency item.

Also, in a second mode of the present invention, the instructions cause the computer to further execute: giving the benefit in the execution of the lottery game when the acquisition time is a specific time or after the specific time.

Also, in a third mode of the present invention, the instructions cause the computer to further execute: giving more benefit in the execution of the lottery game the more recent the acquisition time is.

Also, in a fourth mode of the present invention, the instructions cause the computer to further execute: giving the benefit in the execution of the lottery game when the acquisition time is before a specific time.

Also, in a fifth mode of the present invention, the instructions cause the computer to further execute: giving more benefit in the execution of the lottery game the less recent the acquisition time is.

Also, in a sixth mode of the present invention, the instructions cause the computer to further execute: when consuming a plurality of currency items, giving the benefit in the execution of the lottery game based on a most recent acquisition time among acquisition times of the currency items.

Also, in a seventh mode of the present invention, the instructions cause the computer to further execute: when consuming a plurality of currency items, giving benefit in the execution of the lottery game based on a least recent acquisition time among acquisition times of the currency items.

Also, in an eighth mode of the present invention, the instructions cause the computer to further execute: when consuming a plurality of currency items, giving benefit in the execution of the lottery game based on statistical information on acquisition times of the currency items.

Also, in a ninth mode of the present invention, the instructions cause the computer to further execute: giving the benefit by increasing a lottery draw probability of a specific content having a high rarity included in the lottery target content group.

Also, in a tenth mode of the present invention, the instructions cause the computer to further execute: giving the benefit by adding a specific content having a high rarity to the lottery target content group.

Also, in an eleventh mode of the present invention, the specific content is a content newly added through a game update after the specific time.

Also, in a twelfth mode of the present invention, the currency item includes a paid item that can be acquired through a purchase procedure, and a free item that can be acquired through game execution.

The information processing device according to a thirteenth mode of the present invention is an information processing device that executes a lottery game in which the player can acquire and consume currency items and obtain a content drawn from a lottery target content group; the device comprising a storage that stores an acquisition time at which the player acquired a currency item; and a control device that consumes at least one currency item possessed by the player in response to a request to execute the lottery game, and gives benefit in execution of the lottery game based on the acquisition time of the at least one currency item.

Also, in a fourteenth mode of the present invention, the instructions cause the computer to further execute: causing a display to display a lottery game execution screen that includes an execute button concurrently receiving the request to execute the lottery game and selection of a number of lottery draw, and upon operation of the execute button, consuming the at least one currency item depending on the number of lottery draw.

The above features enable giving benefits or advantages in game operations depending on the acquisition time of the currency item such that a player can be sufficiently motivated to acquire the currency item.

DETAILED DESCRIPTION

Figure 1:
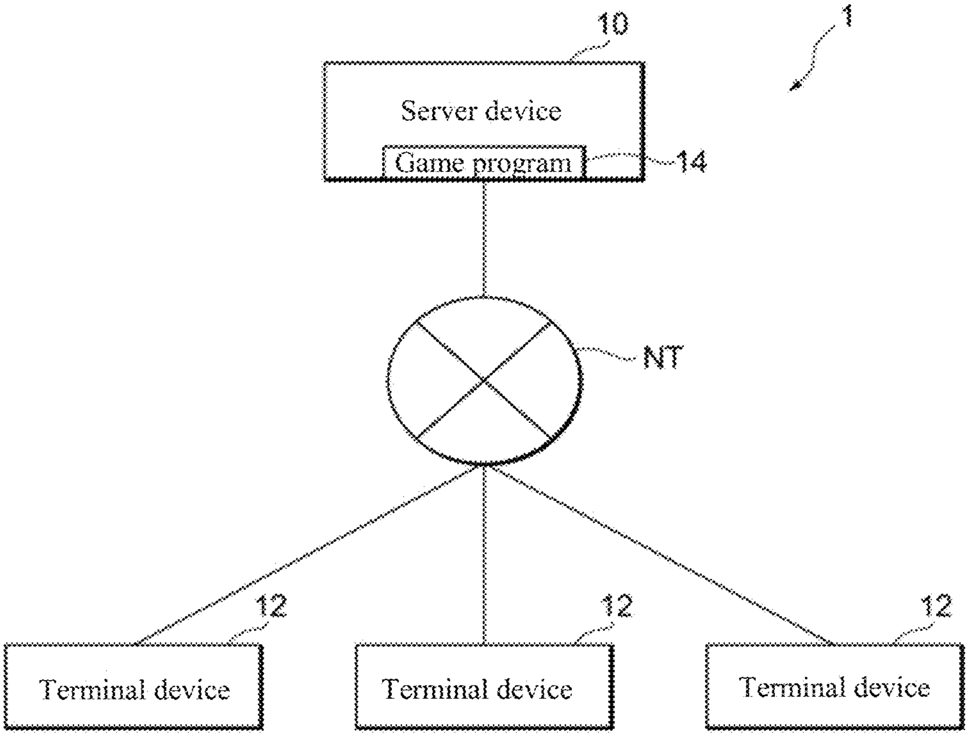
FIG. 1 is a block diagram showing an example of the overall configuration of a game system according to a first embodiment.

A number of embodiments of the present invention will now be described with reference to the appended drawings. To facilitate understanding of the description, components and steps that are the same will be numbered the same as much as possible in the drawings, and redundant description will be omitted.

First Embodiment

A first embodiment will be described now.

Overall Configuration

FIG. 1 is a block diagram showing an example of the overall configuration of a game system 1 according to the first embodiment.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing instructions such as a game program 14, or the instructions themselves, to the player of each terminal device 12 via the communication network NT. In the first embodiment, the server device 10 provides the instructions themselves to the players of the terminal devices 12.

Each terminal device 12 is an information processing device belonging to a player, and is an information processing device that provides a game to a player by executing the instructions received from the server device 10 after the instructions have been installed. Examples of these terminal devices 12 include video game machines, arcade game machines, mobile phones, smartphones, tablets, personal computers, and various other such devices.

Hardware Configuration

Figure 2:
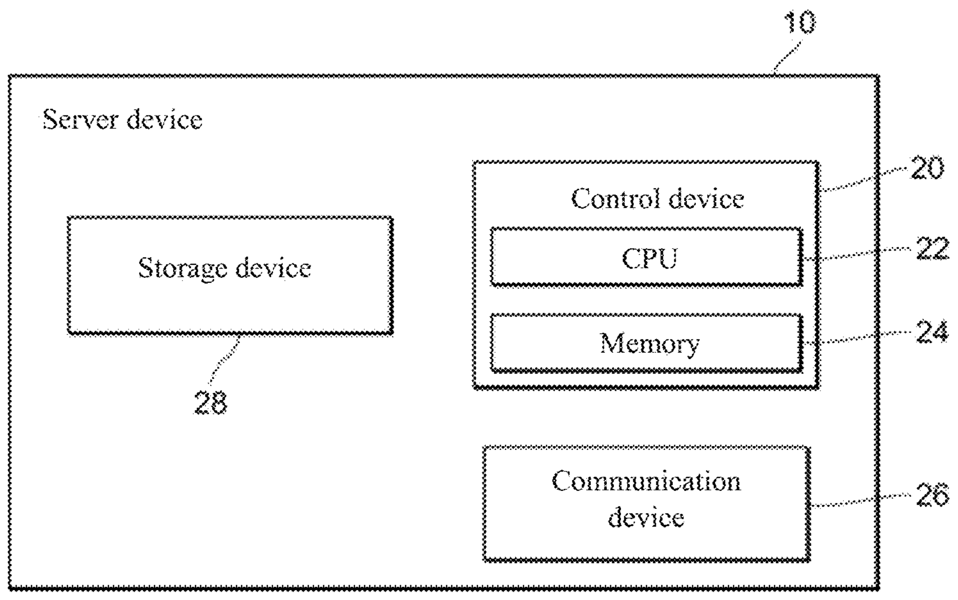
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing specific instructions stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of instructions and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for further comprising an operating device, a display device, and a sound output device, for example.

Figure 3:
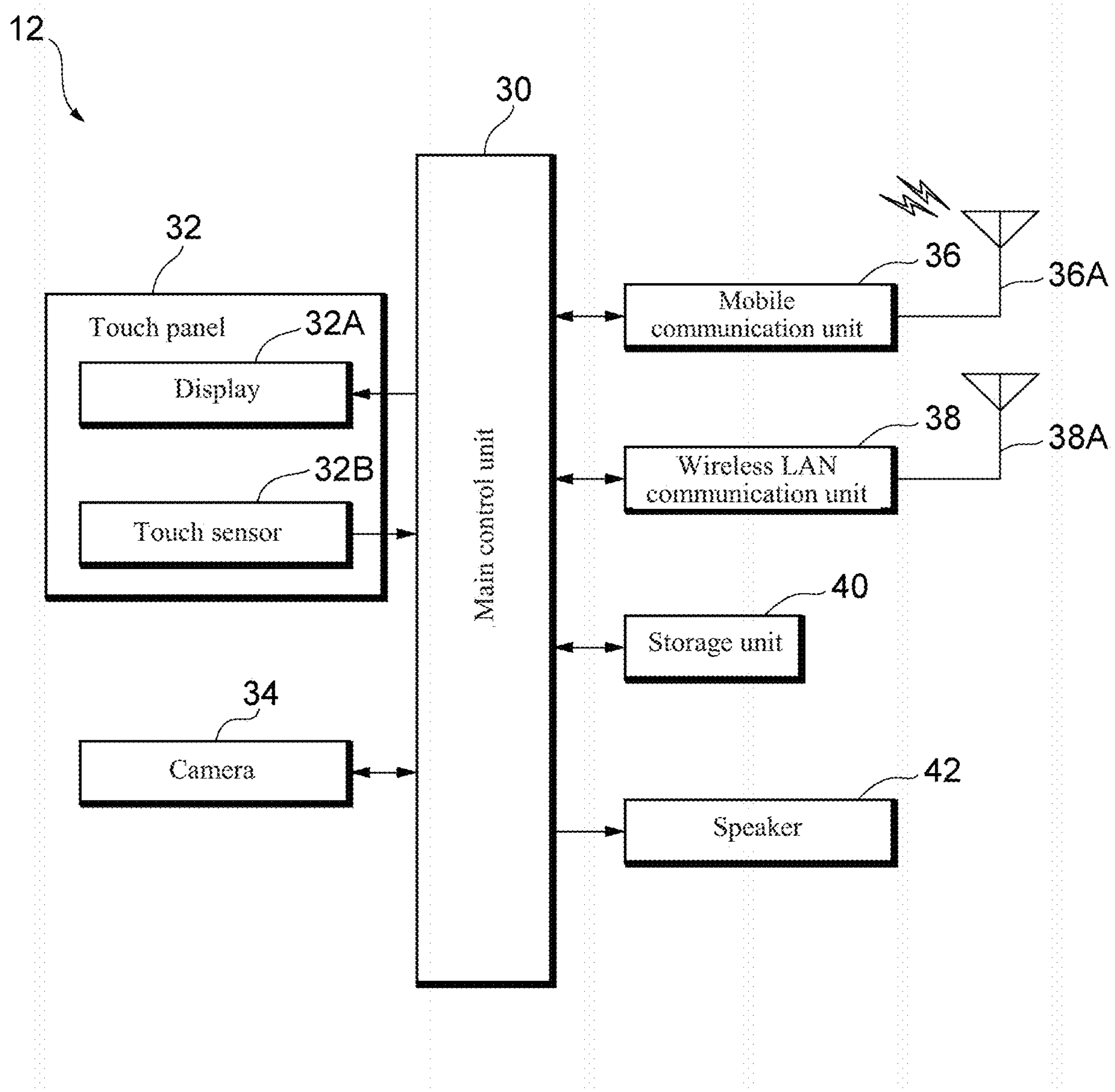
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit (controller) 30, a touch panel (touch screen) 32, a camera 34, a mobile communication unit (mobile communication interface) 36, a wireless LAN communication unit (wireless LAN communication interface) 38, a storage unit 40 (storage), and a speaker 42.

The main control unit 30 includes a CPU, a memory, and so forth. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In the first embodiment, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of instructions and data, such as the game program 14, and play data indicating player information or the progress of the game in the instructions. This play data may be stored in the server device 10.

The speaker 42 has the function of outputting game sounds and so forth.

Game Overview

Games according to the first embodiment include lottery games and quests in which a player is allowed to acquire pieces of content (for example, characters), purchase games, missions, or the like. These lottery games are sometimes referred to as gacha (loot box), raffle, summoning, or the like. These quests are sometimes referred to as battle games, dungeons, searches, or the like.

A lottery game according to the first embodiment is a game in which one or more pieces of content (characters) are chosen (randomly selected) from a lottery target content group (lottery target character group) serving as a lottery target upon an execution request (instruction) from the player to execute a lottery game and provided to the player. This lottery game is executed based on the consumption of currency items possessed by the player.

Examples of these currency items include charged items (for example, paid stones) and non-charged items (for example, free stones). Charged items are paid items that can be acquired by a purchase procedure (payment) using money, a prepaid card, a credit card, electronic money, crypto assets, or the like. For example, one paid item can be purchased for 100 yen. On the other hand, non-charged items are free items that can be acquired by executing a game. Examples of executing a game may include the player logging into the game, clearing a quest for the first time, and completing a mission. Free items can be consumed just the same as paid items in various kinds of games. For example, in the lottery game according to the first embodiment, paid items and free items may be consumed, with no distinction between the two.

Also, a quest according to the first embodiment is a game in which a team composed of one or more characters possessed by the player and enemy characters play against each other based on an execution request (instruction) from the player to execute the quest. For example, in an organization menu for organizing characters to be used in the quest, the player can organize characters to be used in the quest by arbitrarily selecting one or more characters from his or her possessed characters.

These quests are executed based on the consumption of the current stamina value associated with the player. This current stamina value is recovered through the consumption of currency items (paid items or free items). When the player clears the quest, that is, when the hit points of an enemy character (boss character) that appears at the end fall to zero or less, the player can acquire a clearance reward (reward content). Examples of this clearance reward include non-charged items (free items), gacha tickets, coins, characters, training items, player experience points, and so forth. An example of a training item is an item for increasing the character experience points of a character. On the other hand, if the player is unable to clear the quest, he or she can choose whether to continue the quest by consuming one currency item (a paid item or free item) or one continuation item, or to give up on clearing the quest.

Also, a purchase game according to the first embodiment is a game in which pieces of content (for example, a character) selected by the player can be acquired based on a purchase request (instruction) from the player to purchase the content (character). This purchase is executed based on the consumption of currency items (paid items or free items) possessed by the player. This purchase game differs from a lottery game or a quest in that the player can reliably acquire the desired content (characters).

Also, a mission according to the first embodiment is a game in which the player completes a task assigned by the game operator. Examples of this mission may include attaining a certain number of login days, number of friends, player rank, number of times a specific quest is cleared, total amount of current stamina value consumed, and so forth. When this mission is completed, the player can acquire a mission reward (reward content). Examples of this mission reward include non-charged items (free items), gacha tickets, coins, characters, training items, and so forth.

Functional Units

Figure 4:
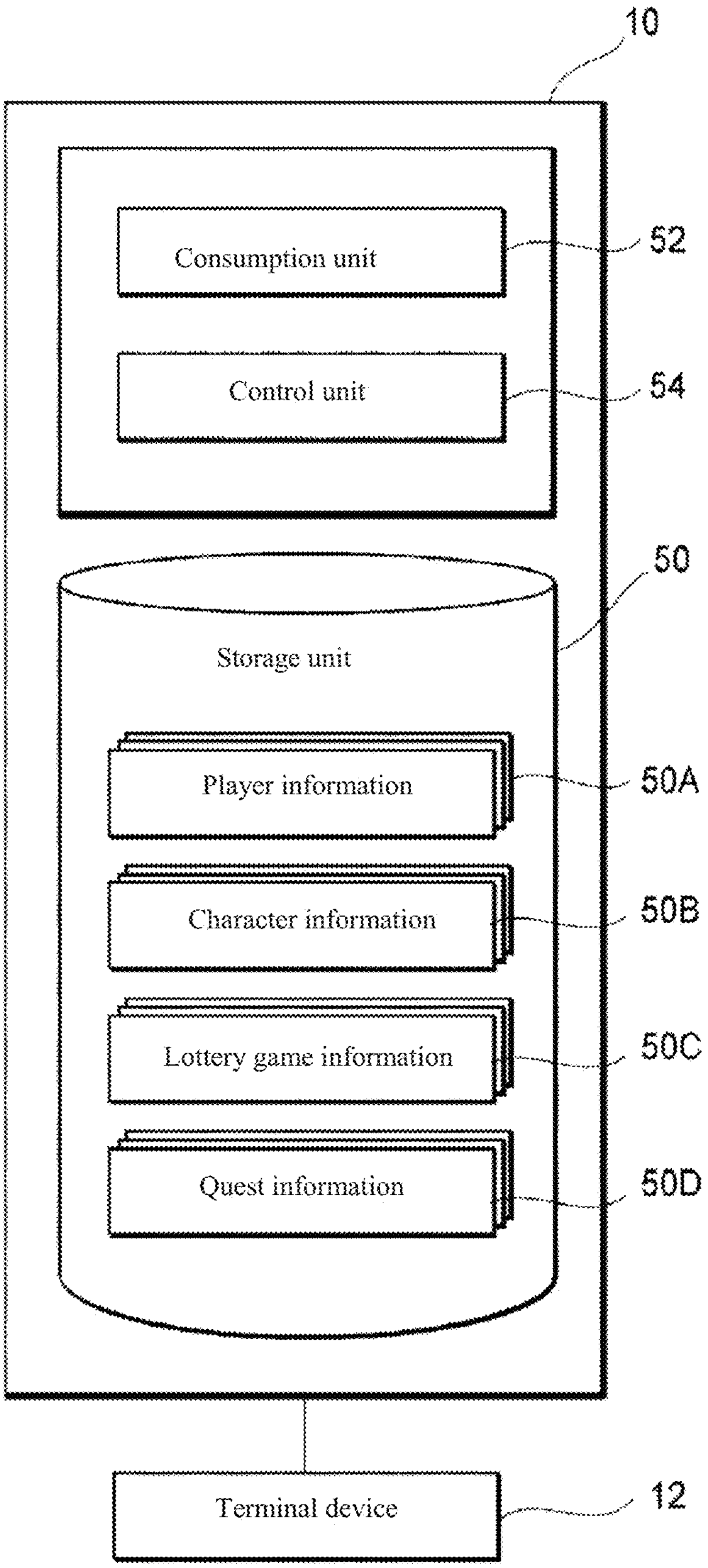
FIG. 4 is a block diagram showing an example of the functional configuration of a server device.

FIG. 4 is a block diagram showing an example of the functional configuration of the server device 10.

As shown in FIG. 4, the server device 10 comprises, as functional components, a storage unit (storage) 50, a consumption unit 52, and a control unit 54. The storage unit 50 is realized in the form of one or more storage devices 28. Functional units other than the storage unit 50 are realized when the control device 20 executes the instructions stored in the storage device 28 or the like.

The storage unit 50 has the function of storing player information 50A, character information 50B, lottery game information 50C, quest information 50D, and so forth.

Player information 50A is stored for each player in association with the player ID of that player. This player information 50A includes, for example, the player's name, age, player rank, possessed content information, stamina information, and so forth.

The player rank increases when the player acquires player experience points, for example.

Possessed content information includes possessed character information, possessed item information, possessed coin information, and so forth.

Possessed character information includes the character ID associated with each possessed character possessed by the player, and the ability parameters (level, specific parameter, hit points, attack power, defense power, etc.) of each character.

Possessed item information includes the number of each item, its acquisition time, etc., and is associated with the item ID of each item possessed by the player. These items include paid items, free items, or the like. In the first embodiment, an acquisition period is stored in association with paid items and free items possessed by the player. This acquisition time may include the date, for example. For example, the acquisition time of the first paid item possessed by the player may include the date (such as Oct. 9, 2021) when the player went through the purchase procedure and acquired the first paid item. Also, for example, the acquisition time of the first free item possessed by the player may include the date (such as Oct. 10, 2021) when the player acquired the first free item as a login bonus. Also, for example, the acquisition time of the second free item possessed by the player may include the date (such as Oct. 11, 2021) when the player acquired the second free item as a clearance reward for a quest. Also, for example, the acquisition time of the third free item possessed by the player may include the date (such as Oct. 12, 2021) when the player acquired the third free item as a mission reward.

Possessed coin information includes the number of coins possessed by the player.

Stamina information includes the current stamina value or the stamina upper limit value, and the stamina restoration amount. The current stamina value is a value consumed when the player executes a quest in the game. This current stamina value is restored by a specific amount (such as 1) after a certain period of time (such as 3 minutes) elapses, and is restored up to the stamina upper limit value. The stamina upper limit value is the upper limit value to which the current stamina value can be restored over time or through restoration processing. The stamina upper limit value may increase along with the player rank, for example. The stamina restoration amount includes the amount (such as 10) by which the current stamina value is restored by the consumption of one currency item. This stamina restoration amount increases by a specific amount (such as 1) when the player rank goes up by 1.

Character information 50B is stored for each character in association with the character ID of that character. The character information 50B may include, for example, the character name and image, ability parameter information, rarity, and add time. This character information 50B is updated from time to time through a game update (a version upgrade or update) by the game operator.

Ability parameter information includes the initial values and maximum values for the various ability parameters of a character.

Rarity may be represented by a number from 1 to 6, for example. This number may be indicated by a number of stars, for example. A character with a high rarity is set with an ability parameter or the like that is advantageous in a game type (such as a quest).

Add time may include, for example, the date on which a character was newly added through a game update (the date on which the game was updated). For example, the add time of a certain character may be Oct. 1, 2021. The add time of characters that have existed since the start of the game operation may include the date on which the operation commenced.

Lottery game information 50C is stored for each lottery game in association with the lottery game ID of the lottery game. The lottery game information 50C includes the lottery game name and cost, lottery target information, and so forth.

Cost includes the number of currency items (paid items or free items) required to execute one lottery. For instance, the cost for a first lottery game may be five paid items or five free items. Also, for instance, the cost for a second lottery game may be two paid items or two free items. Also, for instance, the cost for a third lottery game may be one paid item or one free item.

Lottery target information includes the character IDs of the characters constituting the lottery target character group that is the lottery target of a lottery game, and the appearance frequency (weighting) associated with that character ID. Appearance frequency may be represented by a number from 1 to 10, for example. The appearance frequency is set to a low numerical value for a character with a high rarity, and to a high numerical value for a character with a low rarity. The appearance frequency may be set to different numerical values among characters of the same rarity (such as a rarity of 6). Here, the probability of drawing one character is a value obtained by dividing the appearance frequency set for that one character by the total value of the appearance frequencies set for each of the characters that constitute the lottery target character group. More specifically, if the appearance frequency set for one character is 2 and the total value of the appearance frequencies set for each of the characters that constitute the lottery target character group is 400, the probability of drawing that one character is 2/400 (0.5%).

Quest information 50D is stored for each quest in association with the quest ID of that quest. The quest information 50D includes the quest name, consumed stamina value, enemy character information, clearance reward information, and so forth.

Consumed stamina value includes the value required to execute the quest. Consumed stamina value is consumed from the player's current stamina value. The higher the difficulty of the quest, the higher the consumed stamina value may be, for example.

Enemy character information includes character IDs and ability parameters of the enemy characters that appear in a quest. This enemy character includes a boss character that appears at the end of a quest.

Clearance reward information includes the number of free items and coins that can be acquired as a clearance reward when a quest is cleared for the first time, the character IDs and drop rates of characters that can be acquired, player experience points, and so forth. The drop rate is the probability that the player will acquire a character that can be acquired. For the drop rate according to the first embodiment, the higher the difficulty of a quest, the higher this probability is.

The consumption unit 52 is a functional unit for consuming currency items possessed by the player. In the first embodiment, the consumption unit 52 consumes one or more currency items possessed by the player in response to a request from the player to execute a lottery game. For example, if the player possesses both paid items and free items, the consumption unit 52 may preferentially consume free items. Also, when a paid item possessed by the player is consumed, for example, the consumption unit 52 may consume the paid items starting with the one with the least recent acquisition time. Also, when an free item possessed by the player is consumed, for example, the consumption unit 52 may consume the free items starting with the one with the least recent acquisition time.

Also, when three free items are consumed upon a request from the player to execute a lottery game, for example, the consumption unit 52 may reduce the number of free items by three in the possessed item information, and delete the acquisition times corresponding to each of those three free items.

Also, when two paid items are consumed upon a request from the player to execute a lottery game, for example, the consumption unit 52 may reduce the number of paid items by two in the possessed item information, and delete the acquisition times corresponding to each of those two paid items.

The control unit 54 is a functional unit for controlling the entire game. In the first embodiment, the control unit 54 allows the player to acquire paid items through a purchase procedure or allows the player to acquire free items through game execution. For example, the control unit 54 updates the possessed item information in the player information 50A when the player is allowed to acquire a currency item. More specifically, when the player acquires five paid items through a purchase procedure, the control unit 54 increases the number of paid items by five in the possessed item information, and stores the current date as the acquisition time corresponding to each of those five paid items. Also, when the player acquires three free items through game execution, the control unit 54 increases the number of free items by three in the possessed item information, and stores the current date as the acquisition time corresponding to each of those three free items.

Also, in the first embodiment, the control unit 54 executes a lottery game in which the player is provided with one or more characters drawn from the lottery target character group in response to the consumption of a currency item by the consumption unit 52. Also, the control unit 54 gives benefit in the execution of the lottery game according to the acquisition time of the currency item consumed by the consumption unit 52. More specifically, the control unit 54 may make it easier than usual to provide one or more specific characters (specific content), or increase the number of characters to be provided, or provide additional content, according to the acquisition time of the consumed currency item. An example of this specific character may include a character with a high rarity that has been newly added through a game update after a specific time (discussed below). Specific examples of giving benefit (or priority) will be described below.

(1) Increasing Probability of Drawing Specific Characters

An example of giving benefit is increasing the lottery draw probability of a specific character (specific content) having a high rarity that is included in a lottery target character group (lottery target content group) of a lottery game. More specifically, the control unit 54 may increase by 2 the appearance frequency (weight) of each specific character with a rarity of 6 included in the lottery target character group of the lottery game.

(2) Addition of Specific Characters to Lottery Target Character Group

An example of giving benefit is the addition of a specific character (specific content) with a high rarity to a lottery target character group (lottery target content group). More specifically, the control unit 54 may add a specific character with a rarity of 6 to the lottery target character group of the lottery game, and may set the appearance frequency (weight) of that specific character to 2.

(3) Increasing the Number of Lottery Draws

An example of giving benefit is increasing the number of lottery draws. More specifically, the control unit 54 may increase the number of lottery draws by a specific number (such as 1) and increase the number of characters provided to the player by the specific number (such as 1).

(4) Providing Additional Content

An example of giving benefit is providing additional content. More specifically, the control unit 54 may provide the player with additional content (bonus content) in addition to the drawn character.

Also, the control unit 54 may give benefit in the execution of the lottery game when the acquisition time of the currency item consumed by the consumption unit 52 is before or after the specific time. This specific time may be, for example, one day ago (such as Oct. 30, 2021), 10 days ago (such as Oct. 21, 2021), 20 days ago (such as Oct. 11, 2021), 30 days ago (such as Oct. 1, 2021), or 3 months ago (such as Jul. 31, 2021), counting from the consumption time when the currency item was consumed (such as Oct. 31, 2021). A specific example will now be given in which the control unit 54 gives benefit in the execution of a lottery game according to the acquisition time.

(1) Giving Benefit if After a Specific Time

For example, the control unit 54 may give benefit in the execution of the lottery game when the acquisition time of the consumed currency item is after a specific time. More specifically, if the acquisition time of the consumed currency item is before a specific time (such as Oct. 11, 2021), the control unit 54 would not give benefit in the execution of the lottery game, but would give benefit in the execution of the lottery game if the acquisition time is after the specific time. That is, the control unit 54 would give benefit in the execution of the lottery game when the acquisition time of the consumed currency item is close to the consumption time (such as Oct. 31, 2021) when that currency item was consumed (when the acquisition time is recent).

Also, the control unit 54 may give more benefit in the execution of the lottery game, the more recent the acquisition time of the consumed currency item is (the closer it is to the consumption time). More specifically, when the acquisition time is between Oct. 25 and Oct. 31, 2021, the control unit 54 may increase by 5 the appearance frequency (weight) of the specific character included in the lottery target character group. Also, when the acquisition time is between Oct. 18 and Oct. 24, 2021, the control unit 54 may increase by 3 the appearance frequency (weight) of the specific character included in the lottery target character group. Also, when the acquisition time is between Oct. 11 and Oct. 17, 2021, the control unit 54 may increase by 2 the appearance frequency (weight) of the specific character included in the lottery target character group.

(2) Giving Benefit if Before a Specific Time

For example, the control unit 54 may give benefit in the execution of the lottery game when the acquisition time of the consumed currency item is before a specific time. More specifically, if the acquisition time of the consumed currency item is after a specific time (such as Jul. 31, 2021), the control unit 54 would not give benefit in the execution of the lottery game, but would give benefit in the execution of the lottery game if the acquisition time is before the specific time. That is, the control unit 54 would give benefit in the execution of the lottery game when the acquisition time of the consumed currency item is a long way from the consumption time (such as Oct. 31, 2021) when that currency item was consumed (when the acquisition time is less recent).

Also, the control unit 54 may give more benefit in the execution of the lottery game the less recent the acquisition time of the consumed currency item is (the longer it is from the consumption time). More specifically, if the acquisition time is between Jul. 1 and Jul. 31, 2021, the control unit 54 may add one kind of specific character to the lottery target character group, and set the appearance frequency (weight) of that one kind of specific character to 1. Also, if the acquisition time is between Jun. 1 and Jun. 30, 2021, the control unit 54 may add two kinds of specific characters to the lottery target character group, and set the appearance frequency (weight) of each of those two kinds of specific characters to 2. Also, if the acquisition time is before May 1, 2021, the control unit 54 may add three kinds of specific characters to the lottery target character group, and set the appearance frequency (weight) of each of those three kinds of specific characters to 3.

Also, when a plurality of currency items are consumed, the control unit 54 may give benefit in the execution of a lottery game according to the acquisition time of each of those currency items.

For example, the control unit 54 may give benefit in the execution of the lottery game according to the most recent acquisition time among the acquisition times of each of the plurality of consumed currency items. More specifically, when five currency items are consumed upon a request to execute a lottery game, the control unit 54 may give benefit in the execution of the lottery game according to whether the most recent acquisition time among the acquisition times of each of the five currency items is after a specific time.

Also, for example, the control unit 54 may give more benefit in the execution of the lottery game, the closer the most recent acquisition time among the acquisition times of each of the five currency items is to the consumption time (more recent). The control unit 54 may give more benefit in the execution of the lottery game the farther the most recent acquisition time among the acquisition times of each of the five currency items is from the consumption time (less recent).

Also, for example, the control unit 54 may give benefit in the execution of the lottery game according to the least recent acquisition time among the acquisition times of each of the plurality of consumed currency items. More specifically, when five currency items are consumed upon a request to execute a lottery game, the control unit 54 may give benefit in the execution of the lottery game according to whether the least recent acquisition time among the acquisition times of each of the five currency items is after a specific time.

Also, for example, the control unit 54 may give more benefit in the execution of the lottery game, the farther the least recent acquisition time among the acquisition times of each of the five currency items is from the consumption time (less recent). The control unit 54 may give more benefit in the execution of the lottery game the closer the least recent acquisition time among the acquisition times of each of the five currency items is to the consumption time (more recent).

Also, for example, the control unit 54 may give benefit in the execution of the lottery game according to statistical information about the acquisition time of each of the plurality of consumed currency items. More specifically, when five currency items are consumed upon a request to execute a lottery game, the control unit 54 may give benefit in the execution of the lottery game according to whether statistical information (such as average value, median value, mode value, etc.) about the acquisition time of each of the five currency items is after a specific time.

Also, for example, the control unit 54 may give more benefit in the execution of the lottery game the closer the statistical information about the acquisition time of each of the five currency items is to the consumption time (more recent). The control unit 54 may give more benefit in the execution of the lottery game the farther the statistical information about the acquisition time of each of the five currency items is from the consumption time (less recent).

Flow of Processing

Figure 5:
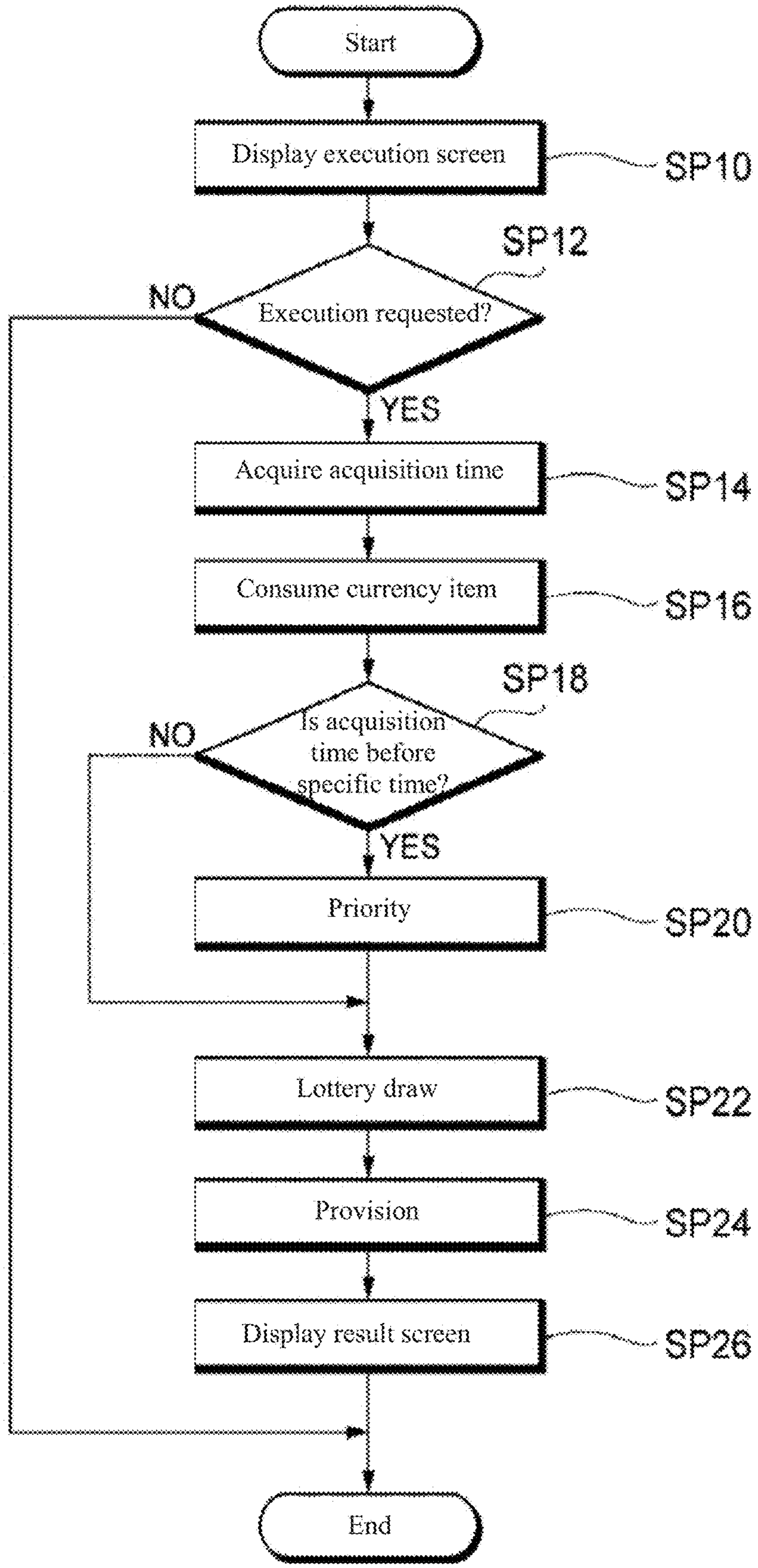
FIG. 5 is a flowchart showing an example of the flow of processing performed by each functional units shown in FIG. 4 in the game system according to the first embodiment.

FIG. 5 is a flowchart showing an example of the flow of processing performed by each functional units shown in FIG. 4 in the game system according to the first embodiment. Also, the processing of the following steps may be started, for example, at the point when the first lottery game (lottery game A) is selected by the player in the lottery game menu. The order and details of the following steps can be changed as needed.

(Step SP10)

The control unit 54 causes the touch panel 32 to display an execution screen for the lottery game (first lottery game).

Figure 6:
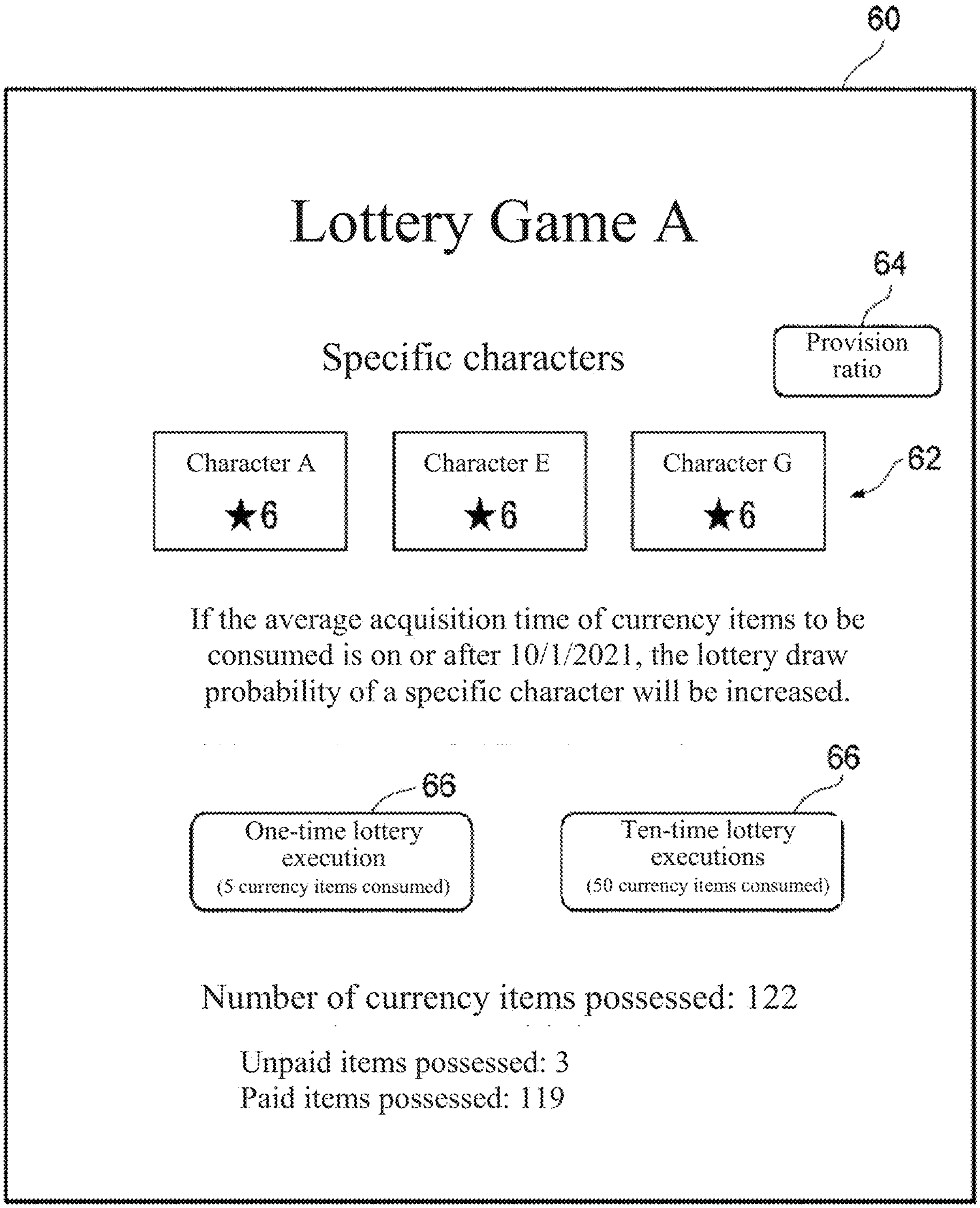
FIG. 6 is a diagram showing an example of an execution screen for a lottery game according to the first embodiment.

FIG. 6 is a diagram showing an example of an execution screen for a lottery game according to the first embodiment.

As shown in FIG. 6, the execution screen 60 is provided with a lottery target information area 62, a provision ratio button 64, and an execute button 66. The lottery target information area 62 shows specific characters (characters for perusal) included in the lottery target character group of the lottery game (first lottery game). Also, the lottery target information area 62 shows that the execution of the lottery game is given benefit when the average acquisition times of the currency items to be consumed is recent. The provision ratio button 64 is used to move to a screen showing the name, rarity, lottery draw probability, etc., of each of the characters constituting the lottery target character group of the lottery game. The execute button 66 is used to request the execution of a lottery game (first lottery game). There may be two kinds of execute button 66, for example, and the player can use each button to select the number of lottery draws (such as once or 10 times) to be requested for execution.

(Step SP12)

The control unit 54 determines whether there is an execution request from the player to execute a lottery game (first lottery game). For example, the control unit 54 may determine whether or not the player has pressed the execute button for the lottery game. Then, if the determination is positive, the processing moves to the processing of step SP14. On the other hand, if the determination is negative, the processing ends the processing series shown in FIG. 5.

(Step SP14)

The consumption unit 52 refers to the cost in the lottery game information 50C and acquires the number of currency items to be consumed (such as five items) according to the number of lottery draws (such as once) that have been requested to be executed in step SP12. Then, the consumption unit 52 refers to the possessed item information in the player information 50A to acquire the acquisition times of each of the currency items to be consumed. More specifically, the consumption unit 52 may acquire the respective acquisition times of three free items and two paid items possessed by the player. Then, the processing moves to the processing of step SP16.

(Step SP16)

The consumption unit 52 consumes the number of currency items to be consumed as acquired in step SP14. For instance, the consumption unit 52 may reduce the number of free items by three and the number of paid items by two in the possessed item information of the player information 50A. Then, the consumption unit 52 deletes the acquisition times corresponding to each of the three free items and the acquisition times corresponding to each of the two paid items in the possessed item information of the player information 50A. Then, the processing moves to the processing of step SP18.

(Step SP18)

The control unit 54 determines whether the average value of the acquisition time of each of the currency items to be consumed that were acquired in step SP14 is after a specific time (such as 30 days before the current time). Then, if the determination is positive, the processing then moves to the processing of step SP20. On the other hand, if the determination is negative, the processing moves to the processing of step SP22.

(Step SP20)

The control unit 54 gives benefit in the execution of the lottery game. For example, the control unit 54 may increase the lottery draw probability of a specific character having a high rarity included in the lottery target character group in the first lottery game. More specifically, the control unit 54 may increase by 2 the appearance frequency (weight) of each specific character whose rarity is 6 in the lottery target information of the lottery game information 50C. This specific character may be, for example, a character that was newly added through a game update after a specific time. When the first lottery game ends, the control unit 54 initializes the appearance frequency of the specific character in the lottery target information. Then, the processing moves to the processing of step SP22.

(Step SP22)

The control unit 54 draws the same number of characters (such as one character) as the number of lottery draws requested to be executed in step SP12 (such as one time) from the lottery target character group in the lottery game (first lottery game). For example, the control unit 54 may refer to the lottery target information in the lottery game information 50C and draw a character according to the lottery draw probability of each of the characters constituting the lottery target character group. Then, the processing moves to the processing of step SP24.

(Step SP24)

The control unit 54 provides the character drawn in step SP22 to the player. For example, the control unit 54 adds the drawn character to the possessed character information in the player information 50A. Then, the processing moves to the processing of step SP26.

(Step SP26)

The control unit 54 causes the touch panel 32 to display a results screen that includes the character provided in step SP24.

Figure 7:
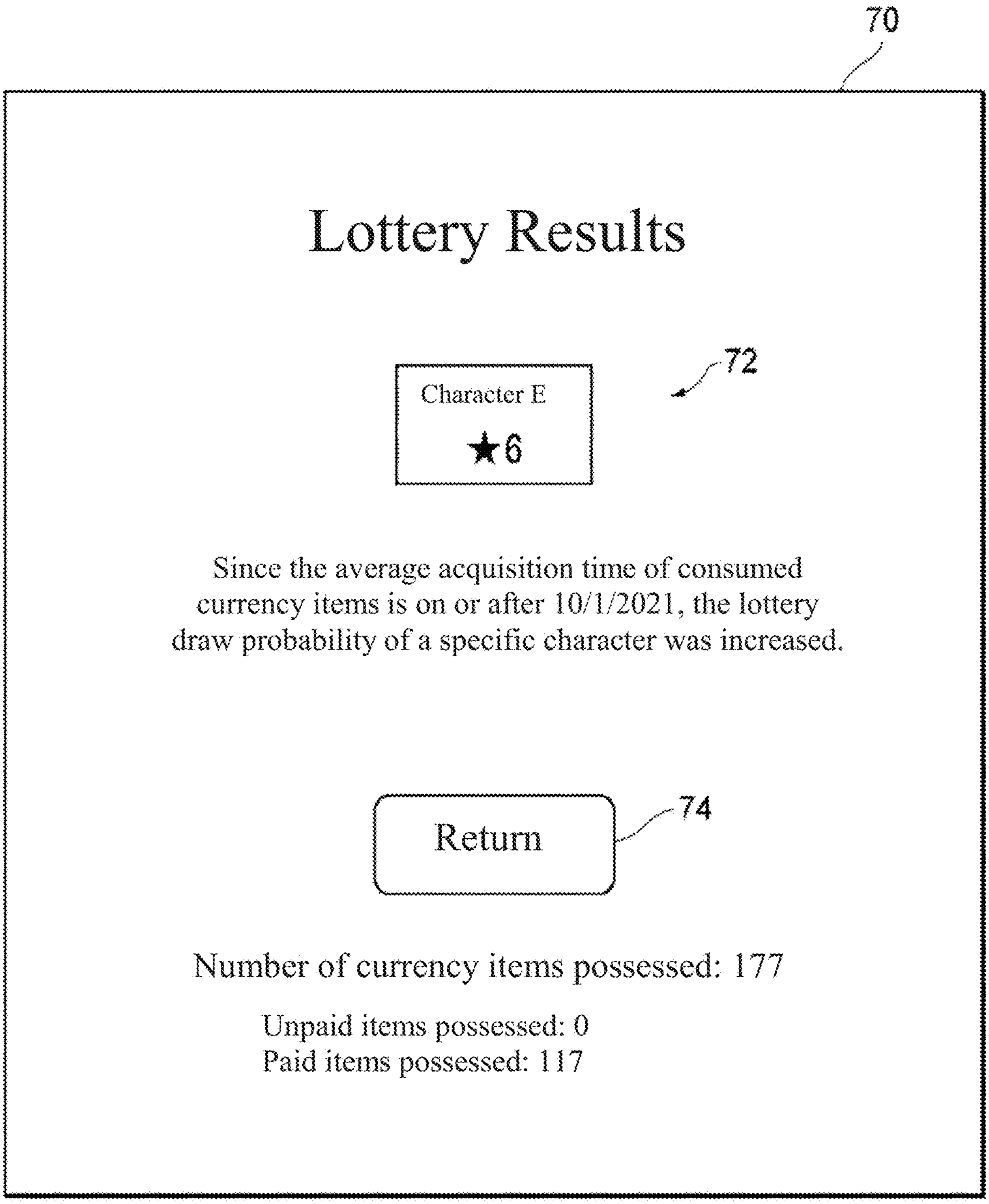
FIG. 7 is a diagram showing an example of a results screen according to the first embodiment.

FIG. 7 is a diagram showing an example of a results screen 70 according to the first embodiment.

As shown in FIG. 7, the results screen 70 is provided with a result information area 72 and a return button 74. Drawn characters are displayed in result information area 72. Also, the result information area 72 shows that benefit was given to the execution of the lottery game (first lottery game) when the acquisition time of a consumed currency item was after a specific time. The return button 74 is used to return to the execution screen of the lottery game (first lottery game).

Then, the processing ends the processing series shown in FIG. 5.

Technical Improvements

In the first embodiment above, a non-transitory computer readable recording medium stores instructions for a computer that executes a lottery game in which a player can acquire and consume currency items and obtain a content drawn from a lottery target content group, the instructions causing the computer to function as a storage unit 50 for storing the acquisition time when the player acquired a currency item, a consumption unit 52 for consuming the currency items possessed by the player in response to a request to execute the lottery game, and a control unit 54 for giving benefit in the execution of the lottery game according to the acquisition time of the consumed currency items.

With this configuration, the execution of the lottery game is given benefit according to the acquisition time when the player acquired the currency item, which gives the player the benefit of holding a currency item over a long period of time, or the benefit of consuming a currency item sooner. As a result, the player can be sufficiently motivated to acquire currency items.

Also, in the first embodiment, the control unit 54 gives benefit in the execution of the lottery game when the acquisition time is a specific time or after the specific time.

With this configuration, when the acquisition time is the specific time or after the specific time, execution of the lottery game is given benefit, which gives the player the benefit of consuming currency items sooner. Therefore, this motivates a player who has acquired a currency item to play a lottery game sooner, which makes the game more enjoyable. Also, the game operator can reduce the burden of having to manage currency items possessed by players over a long period of time.

Also, in the first embodiment, the control unit 54 gives more benefit in the execution of the lottery game the more recent the acquisition time is.

With this configuration, the more recent the acquisition time is, the more benefit is given to the execution of the lottery game, which gives the player the benefit of consuming currency items sooner. Therefore, this motivates a player who has acquired a currency item to play a lottery game sooner, which makes the game more enjoyable. Also, the game operator can reduce the burden of having to manage currency items possessed by players over a long period of time.

Also, in the first embodiment, the control unit 54 gives benefit in the execution of the lottery game when the acquisition time is before a specific time.

With this configuration, when the acquisition time is before the specific time, execution of the lottery game is given benefit, which gives the player the benefit of holding currency items over a long period of time. Therefore, a player who has not consumed any currency items over a long period of time can be motivated to play a lottery game, which makes the game more enjoyable.

Also, in the first embodiment, the control unit 54 gives more benefit in the execution of the lottery game the less recent the acquisition time is.

With this configuration, the less recent the acquisition time is, the more benefit is given to the execution of the lottery game, which gives the player the benefit of holding currency items over a longer period of time. Therefore, a player who has not consumed any currency items over a long period of time can be sufficiently motivated to play a lottery game, which makes the game more enjoyable.

Also, in the first embodiment, when a plurality of currency items are consumed, the control unit 54 gives benefit in the execution of the lottery game according to the most recent acquisition time among the acquisition times of each of the currency items.

With this configuration, since benefit is given to the execution of the lottery game according to the most recent acquisition time among the acquisition times of each currency item, a player who possesses a plurality of currency items can think about strategy as to whether it would be better to hold those currency items over a long period of time or to consume them sooner. Also, this encourages the player to consume a plurality of currency items at the same time.

Also, in the first embodiment, when a plurality of currency items are consumed, the control unit 54 gives benefit in the execution of the lottery game according to the least recent acquisition time among the acquisition times of each of the currency items.

With this configuration, since benefit is given to the execution of the lottery game according to the least recent acquisition time among the acquisition times of each currency item, a player who possesses a plurality of currency items can think about strategy as to whether it would be better to hold those currency items over a long period of time or to consume them sooner. Also, this encourages the player to consume a plurality of currency items at the same time.

Also, in the first embodiment, when a plurality of currency items are consumed, the control unit 54 gives benefit in the execution of the lottery game according to the statistical information of the acquisition time of each of the currency items.

With this configuration, since benefit is given to the execution of the lottery game according to statistical information about the acquisition time of each currency item, a player who possesses currency items can think about strategy as to whether it would be better to hold those currency items over a long period of time or to consume them sooner. Also, this encourages the player to consume a plurality of currency items at the same time.

Also, in the first embodiment, the benefit may be to increase the lottery draw probability of a specific content having a high rarity included in the lottery target content group.

With this configuration, the specific content having the high rarity is more likely to be drawn according to the acquisition time when the player acquired the currency item, which gives the player the benefit of holding currency items over a long period of time, or the benefit of consuming currency items sooner.

Also, in the first embodiment, the benefit may be to add a specific content having a high rarity to the lottery target content group.

With this configuration, specific high-rarity content is added to the lottery target depending on when the player acquired the currency item, which gives the player the benefit of holding a currency item over a long period of time, or the benefit of consuming a currency item sooner.

Also, in the first embodiment, the specific content may be a content newly added through a game update after a specific time.

With this configuration, content newly added through a game update after a specific time according to when the player acquired the currency item is more likely to be provided than usual, which gives the player the benefit of holding a currency item over a long period of time, or the benefit of consuming a currency item sooner.

Also, in the first embodiment, currency items may include paid items that can be acquired through a purchase procedure, and free items that can be acquired by executing a game.

With this configuration, when a player acquires a paid item through a purchase procedure, or an free item by executing a game, the player can benefit from holding the paid item or free item over a long period of time, or benefit from consuming the paid item or free item sooner. This allows the player to be sufficiently motivated to acquire paid items and free items, which makes the game more enjoyable.

Second Embodiment

A second embodiment will now be described.

The second embodiment differs from the first embodiment in that the consumption unit 52 consumes currency items possessed by the player in response to a request to execute restoration processing, and that the control unit 54 gives benefit in the execution of restoration processing to restore the current stamina value. Aspects of the configuration and functions of the game system according to the second embodiment that are the same as those of the game system according to the first embodiment are omitted from the description below.

In the second embodiment, the consumption unit 52 consumes one or more currency items possessed by the player in response to a request from the player to execute restoration processing to restore the current stamina value.

Also, when two free items are consumed upon a request from the player to execute restoration processing to restore the current stamina value, the consumption unit 52 reduces the number of free items by two in the possessed item information, and deletes the acquisition times corresponding to these two free items.

Also, when one paid item is consumed upon a request from the player to execute restoration processing to restore the current stamina value, the consumption unit 52 reduces the number of paid items by one in the possessed item information, and deletes the acquisition time corresponding to each paid item.

In the second embodiment, the control unit 54 executes restoration processing to restore the current stamina value associated with the player in response to a currency item being consumed by the consumption unit 52. Also, the control unit 54 gives benefit in the execution of restoration processing according to the acquisition time of a currency item consumed by the consumption unit 52. Specific examples of giving benefit will be described below.

(1) Increasing Restoration Amount

An example of giving benefit is increasing the restoration amount of the current stamina value. More specifically, the control unit 54 may increase the normal restoration amount of the current stamina value (such as 10) to double (such as to 20).

(2) Restoring Stamina Beyond the Upper Limit

An example of giving benefit is restoring the current stamina value beyond the stamina upper limit value associated with the player. More specifically, the control unit 54 may allow the current stamina value to exceed the stamina upper limit value by executing restoration processing.

(3) Providing Additional Content

An example of giving benefit is providing additional content. More specifically, the control unit 54 may provide the player with additional content (bonus content) in addition to executing restoration processing.

Also, the control unit 54 may give benefit in the execution of restoration processing when the acquisition time is before or after a specific time. A specific example will now be given in which the control unit 54 gives benefit in the execution of restoration processing according to the acquisition time.

(1) Giving Benefit if After a Specific Time

For example, the control unit 54 may give benefit in the execution of restoration processing when the acquisition time of the consumed currency item is after a specific time. More specifically, if the acquisition time of the consumed currency item is before a specific time (such as Oct. 11, 2021), the control unit 54 would not give benefit in the execution of restoration processing, but would give benefit in the execution of restoration processing if the acquisition time is after the specific time. That is, the control unit 54 would give benefit in the execution of restoration processing when the acquisition time of the consumed currency item is close to the consumption time of the currency item (such as Oct. 31, 2021).

Also, the control unit 54 may give more benefit in the execution of restoration processing, the more recent the acquisition time of the consumed currency item is (the closer it is to the consumption time). More specifically, when the acquisition time is between Oct. 25 and Oct. 31, 2021, the control unit 54 may increase the restoration amount to four times the normal amount (such as 10). Also, when the acquisition time is between Oct. 18 and Oct. 24, 2021, the control unit 54 may increase the restoration amount to three times the normal amount. Also, when the acquisition time is between Oct. 11 and Oct. 17, 2021, the control unit 54 may increase the restoration amount to double the normal amount.

(2) Giving Benefit if Before a Specific Time

For example, the control unit 54 may give benefit in the execution of restoration processing when the acquisition time of the consumed currency item is before a specific time. More specifically, if the acquisition time of the consumed currency item is after a specific time (such as Jul. 31, 2021), the control unit 54 would not give benefit in the execution of restoration processing, but would give benefit in the execution of restoration processing if the acquisition time is before the specific time. That is, the control unit 54 would give benefit in the execution of restoration processing when the acquisition time of the consumed currency item is a long way from the consumption time (such as Oct. 31, 2021) when that currency item was consumed.

Also, the control unit 54 may give more benefit in the execution of restoration processing the less recent the acquisition time of the consumed currency item is (the longer it is from the consumption time). More specifically, if the acquisition time is between Jul. 1 and Jul. 31, 2021, the control unit 54 may increase the restoration amount to double the normal amount (such as 10). Also, if the acquisition time is between Jun. 1 and Jun. 30, 2021, the control unit 54 may increase the restoration amount to three times the normal amount (such as 10). Also, if the acquisition time is before May 1, 2021, the control unit 54 may increase the restoration amount to four times the normal amount (such as 10).

Also, when a plurality of currency items are consumed, the control unit 54 may give benefit in the execution of restoration processing according to the acquisition time of each of those currency items.

For example, the control unit 54 may give benefit in the execution of restoration processing according to the most recent acquisition time among the acquisition times of each of those currency items. More specifically, when five currency items are consumed upon a request to execute restoration processing, the control unit 54 may give benefit in the execution of restoration processing according to whether the most recent acquisition time among the acquisition times of each of the five currency items is after a specific time.

Also, for example, the control unit 54 may give more benefit in the execution of restoration processing, the closer the most recent acquisition time among the acquisition times of each of the five currency items is to the consumption time (more recent). The control unit 54 may give more benefit in the execution of restoration processing the farther the most recent acquisition time among the acquisition times of each of the five currency items is from the consumption time (less recent).

Also, for example, the control unit 54 may give benefit in the execution of restoration processing according to the least recent acquisition time among the acquisition times of each of the currency items. More specifically, when five currency items are consumed upon a request to execute restoration processing, the control unit 54 may give benefit in the execution of restoration processing according to whether the least recent acquisition time among the acquisition times of each of the five currency items is after a specific time.

Also, for example, the control unit 54 may give more benefit in the execution of restoration processing, the farther the least recent acquisition time among the acquisition times of each of the five currency items is from the consumption time (less recent). The control unit 54 may give more benefit in the execution of restoration processing the closer the least recent acquisition time among the acquisition times of each of the five currency items is to the consumption time (more recent).

Also, for example, the control unit 54 may give benefit in the execution of restoration processing according to statistical information about the acquisition time of each currency item. More specifically, when five currency items are consumed upon a request to execute restoration processing, the control unit 54 may give benefit in the execution of restoration processing according to whether statistical information (such as average value, median value, mode value, etc.) about the acquisition time of each of the five currency items is after a specific time. Also, for example, the control unit 54 may give more benefit in the execution of restoration processing the closer the statistical information about the acquisition time of each of the five currency items is to the consumption time (more recent). The control unit 54 may give more benefit in the execution of restoration processing the farther the statistical information about the acquisition time of each of the five currency items is from the consumption time (less recent).

Flow of Processing

Figure 8:
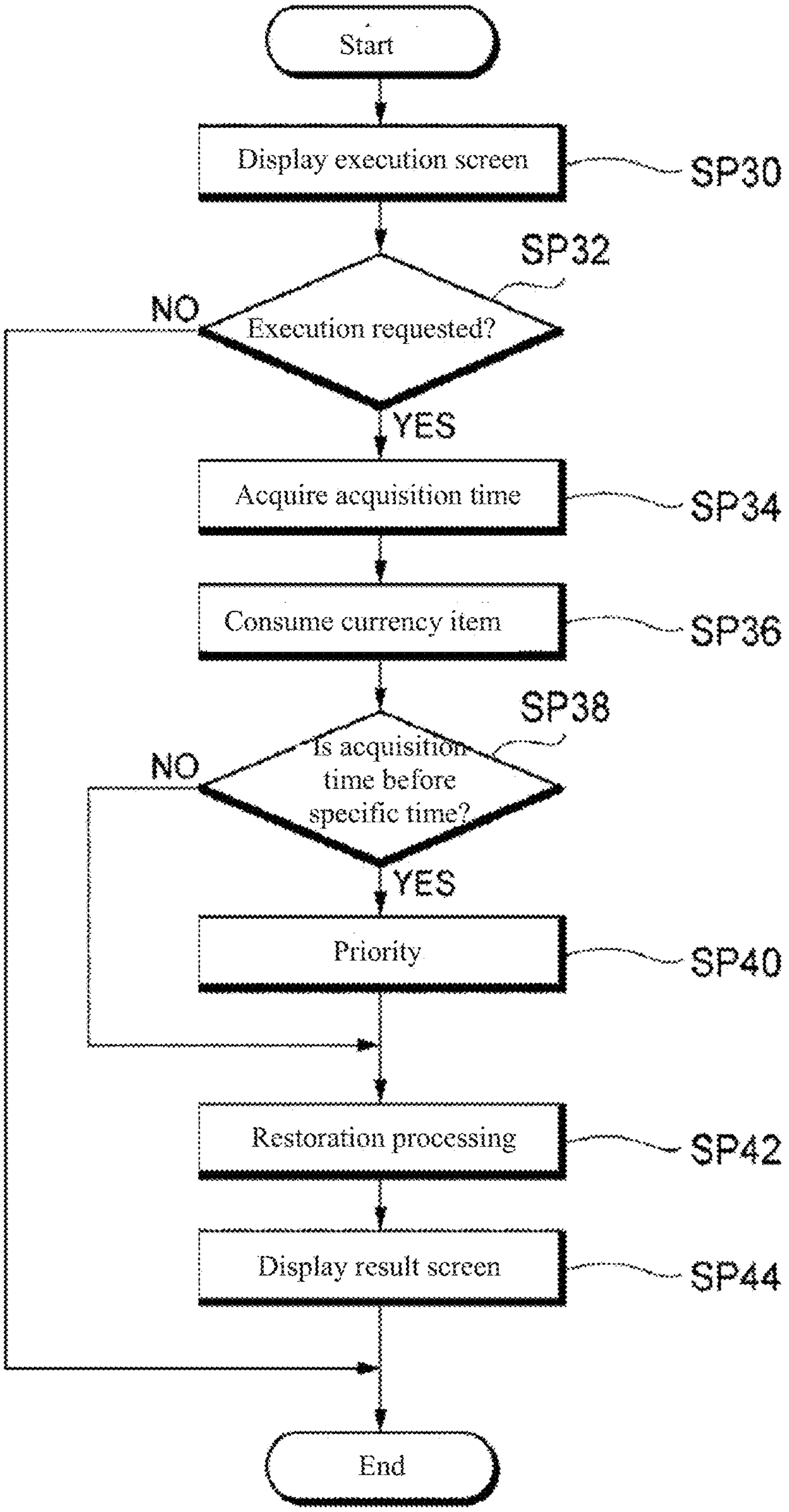
FIG. 8 is a flowchart showing an example of the flow of processing performed by each functional units in the game system according to a second embodiment.

FIG. 8 is a flowchart showing an example of the flow of processing performed by each functional units in the game system according to the second embodiment. Also, the processing of the following steps may be started, for example, at the point when the player selects the current stamina value restoration menu. The order and details of the following steps can be changed as needed.

(Step SP30)

The control unit 54 causes the touch panel 32 to display an execution screen for executing the current stamina value restoration processing.

Figure 9:
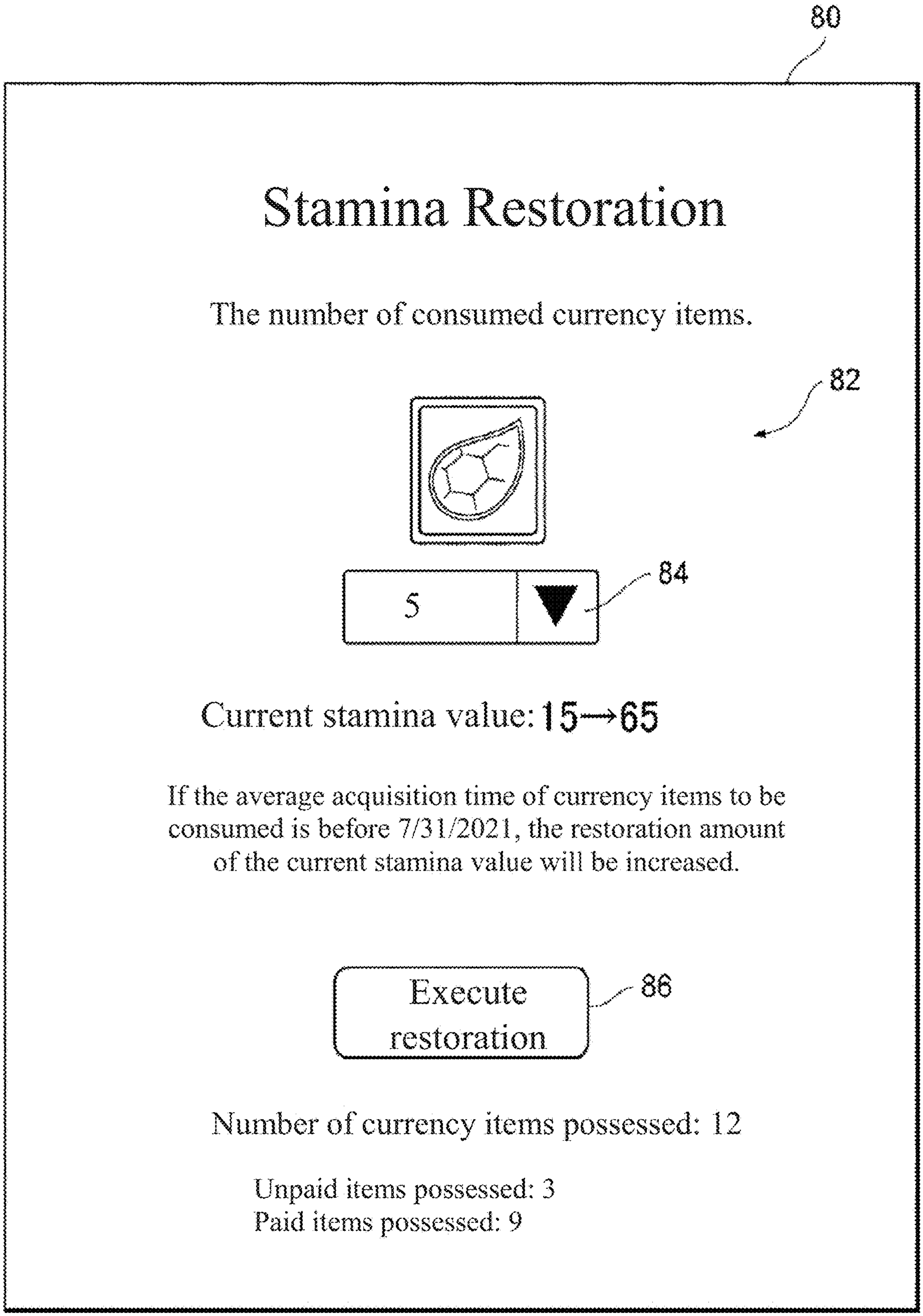
FIG. 9 is a diagram showing an example of an execution screen for recovery processing according to the second embodiment.

FIG. 9 is a diagram showing an example of a restoration processing execution screen 80 according to the second embodiment.

As shown in FIG. 9, the execution screen 80 is provided with a currency item information area 82, a consumption quantity selection button 84, and an execute button 86. In the currency item information area 82 are displayed illustrations of currency items, the number of currency items to be consumed, changes in the current stamina value, and the like. Also, the currency item information area 82 shows that execution of restoration processing is given benefit when the average acquisition times of currency items to be consumed is not recent. The consumption quantity selection button 84 is used for selecting the number (such as 1 to 10) of currency items to be consumed. With this consumption quantity selection button 84, the number of currency items to be consumed can be selected in a pull-down format, for example. The execute button 86 is used for requesting the execution of restoration processing to restore the current stamina value by consuming the selected number of currency items.

Going back to FIG. 8, the processing moves to the processing of step SP32.

(Step SP32)

The control unit 54 determines whether or not there has been an execution request from the player to execute restoration processing. For example, the control unit 54 may determine whether the player has pressed the execute button for restoration processing. If the determination is positive, the processing then moves to the processing of step SP34. On the other hand, if the determination is negative, the processing ends the processing series shown in FIG. 8.

(Step SP34)

The consumption unit 52 acquires the number of currency items to be consumed (such as five) selected on the execution screen. Then, the consumption unit 52 refers to the possessed item information in the player information 50A to acquire the acquisition times of each of the currency items to be consumed. More specifically, the consumption unit 52 may acquire the respective acquisition times of three free items and two paid items possessed by the player. Then, the processing moves to the processing of step SP36.

(Step SP36)

The consumption unit 52 consumes the number of currency items to be consumed as acquired in step SP34. For instance, the consumption unit 52 may reduce the number of free items by three and the number of paid items by two in the possessed item information of the player information 50A. Then, the consumption unit 52 deletes the acquisition times corresponding to each of the three free items and the acquisition times corresponding to each of the two paid items in the possessed item information of the player information 50A. Then, the processing moves to the processing of step SP38.

(Step SP38)

The control unit 54 determines whether the average value of the acquisition time of each of the currency items to be consumed that were acquired in step SP34 is after a specific time (such as 30 days before the current time). Then, if the determination is positive, the processing then moves to the processing of step SP40. On the other hand, if the determination is negative, the processing moves to the processing of step SP42.

(Step SP40)

The control unit 54 gives benefit in the execution of restoration processing. For example, the control unit 54 may increase the restoration amount of the current stamina value. More specifically, the control unit 54 may increase (raise) the stamina restoration amount of the stamina information in the player information 50A by two. That is, the control unit 54 sets the current stamina value to be restored by 12 points per currency item, whereas normally the current stamina value is restored by 10 points per currency item. When the execution of restoration processing ends, the control unit 54 initializes the stamina restoration amount. Then, the processing moves to the processing of step SP42.

(Step SP42)

The control unit 54 restores the current stamina value associated with the player. For example, the control unit 54 may add the product (such as 60) of multiplying the number of currency items consumed in step SP36 (such as five) by the stamina restoration amount (such as 12) of the stamina information in the player information 50A to the current stamina value of the stamina information in the player information 50A. Then, the processing moves to the processing of step SP44.

(Step SP44)

The control unit 54 causes the touch panel 32 to display a result screen including the current stamina value restored in step SP42.

Figure 10:
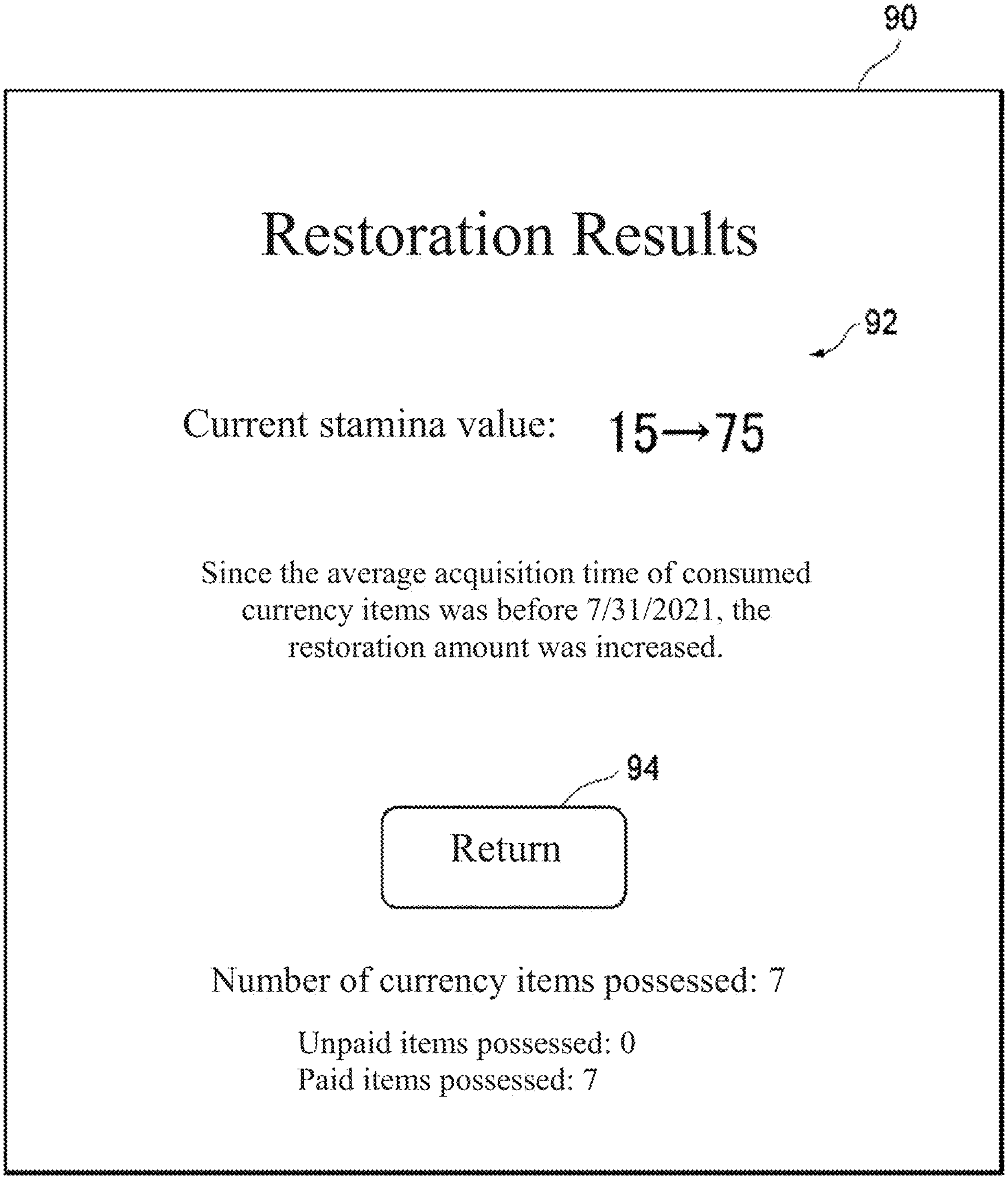
FIG. 10 is a diagram showing an example of a results screen according to the second embodiment.

FIG. 10 is a diagram showing an example of a results screen 90 according to the second embodiment.

As shown in FIG. 10, the results screen 90 is provided with a result information area 92 and a return button 94. The result information area 92 shows the current stamina value restored by the execution of restoration processing. Also, the result information area 92 shows that benefit was given to execution of restoration processing when the acquisition time of a consumed currency item was before a specific time. The return button 94 is used to return to the execution screen where the current stamina value restoration processing is executed.

Then, the processing ends the processing series shown in FIG. 8.

Technical Improvements

In the second embodiment above, a non-transitory computer readable recording medium storing instructions for a computer that executes restoration processing in which a player can acquire and consume currency items and restore a current stamina value associated with the player, the instructions causing the computer to function as a storage unit 50 for storing the acquisition time when the player acquired a currency item, a consumption unit 52 for consuming the currency items possessed by the player in response to a request to execute restoration processing, and a control unit 54 for giving benefit in the execution of restoration processing according to the acquisition time of a consumed currency item.

With this configuration, the execution of restoration processing to restore the current stamina value is given benefit according to the acquisition time when the player acquired a currency item, which gives the player the benefit of holding currency items over a long period of time, or the benefit of consuming currency items sooner. As a result, the player can be sufficiently motivated to acquire currency items.

Also, in the second embodiment, the control unit 54 gives benefit in the execution of restoration processing when the acquisition time is after a specific time.

With this configuration, when the acquisition time is after the specific time, execution of restoration processing is given benefit, which gives the player the benefit of consuming currency items sooner. Therefore, this motivates a player who has acquired a currency item to execute restoration processing sooner, which makes the game more enjoyable. Also, the game operator can reduce the burden of having to manage currency items possessed by players over a long period of time.

Also, in the second embodiment, the control unit 54 gives more benefit in the execution of restoration processing the more recent the acquisition time is.

With this configuration, the more recent the acquisition time is, the more benefit is given to the execution of restoration processing, which gives the player the benefit of consuming currency items sooner. Therefore, this motivates a player who has acquired a currency item to execute restoration processing sooner, which makes the game more enjoyable. Also, the game operator can reduce the burden of having to manage currency items possessed by players over a long period of time.

Also, in the second embodiment, the control unit 54 gives benefit in the execution of restoration processing when the acquisition time is before a specific time.

With this configuration, when the acquisition time is before the specific time, execution of restoration processing is given benefit, which gives the player the benefit of holding currency items over a long period of time. Therefore, a player who has not consumed any currency items over a long period of time can be motivated to execute restoration processing, which makes the game more enjoyable.

Also, in the second embodiment, the control unit 54 gives more benefit in the execution of restoration processing the less recent the acquisition time is.

With this configuration, the less recent the acquisition time is, the more benefit is given to the execution of restoration processing, which gives the player the benefit of holding currency items over a longer period of time. Therefore, a player who has not consumed any currency items over a long period of time can be sufficiently motivated to execute restoration processing, which makes the game more enjoyable.

Also, in the second embodiment, when a plurality of currency items are consumed, the control unit 54 gives benefit in the execution of restoration processing according to the most recent acquisition time among the acquisition times of each of the currency items.

With this configuration, since benefit is given to the execution of restoration processing according to the most recent acquisition time among the acquisition times of each currency item, a player who possesses a plurality of currency items can think about strategy as to whether it would be better to hold those currency items over a long period of time or to consume them sooner. Also, this encourages the player to consume a plurality of currency items at the same time.

Also, in the second embodiment, when a plurality of currency items are consumed, the control unit 54 gives benefit in the execution of restoration processing according to the least recent acquisition time among the acquisition times of each of the currency items.

With this configuration, since benefit is given to the execution of restoration processing according to the least recent acquisition time among the acquisition times of each currency item, a player who possesses a plurality of currency items can think about strategy as to whether it would be better to hold those currency items over a long period of time or to consume them sooner. Also, this encourages the player to consume a plurality of currency items at the same time.

Also, in the second embodiment, when a plurality of currency items are consumed, the control unit 54 gives benefit in the execution of restoration processing according to the statistical information of the acquisition time of each of the currency items.

With this configuration, since benefit is given to the execution of restoration processing according to statistical information about the acquisition time of each currency item, a player who possesses currency items can think about strategy as to whether it would be better to hold those currency items over a long period of time or to consume them sooner. Also, this encourages the player to consume a plurality of currency items at the same time.

Also, in the second embodiment, the benefit may be to increase the restoration amount of the current stamina value.

With this configuration, the restoration amount of the current stamina value increases according to the acquisition time when the player acquired a currency item, which gives the player the benefit of holding a currency item over a long period of time, or the benefit of consuming a currency item sooner.

Furthermore, in the second embodiment, the benefit may be to restore the current stamina value beyond the stamina upper limit value associated with the player.

With this configuration, the current stamina value is restored beyond the stamina upper limit value according to the acquisition time when the player acquired a currency item, which gives the player the benefit of holding the currency item over a long period of time, or the benefit of consuming currency items sooner.

Also, in the second embodiment, currency items may include paid items that can be acquired through a purchase procedure, and free items that can be acquired by executing a game.

With this configuration, when a player acquires a paid item through a purchase procedure, or an free item by executing a game, the player can benefit from holding the paid item or free item over a long period of time, or benefit from consuming the paid item or free item sooner. This allows the player to be sufficiently motivated to acquire paid items and free items, which makes the game more enjoyable.

Modifications

The present invention is not limited to or by the above specific examples. That is, suitable design changes made to the above specific examples by a person skilled in the art are also encompassed by the scope of the present invention as long as they still have the features of the present invention. Also, the elements of the embodiments described above and the modified examples (discussed below) can be combined to an extent that this is technically possible, and these combinations are also encompassed by the scope of the present invention as long as they still have the features of the present invention.

For example, in the first embodiment, a case was described in which, if the player possessed both paid items and free items, the consumption unit 52 preferentially consumed free items, but may instead preferentially consume paid items. Also, a case was described in which, when paid items possessed by the player were consumed, the consumption unit 52 consumed paid items starting with the one having the least recent acquisition time, but paid items may instead be consumed starting from the one with the most recent acquisition time. Also, a case was described in which, when free items possessed by the player were consumed, the consumption unit 52 consumed free items starting with the one having the least recent acquisition time, but free items may instead be consumed starting from the one with the most recent acquisition time.

Also, in the first and second embodiments, a case was described in which the specific time was, for example, a past date (such as 30 days before the current date) calculated from the consumption time (current) when the currency item was consumed, but may instead be a fixed time set in advance by the game operator (such as Sep. 1, 2021).

Also, in the first and second embodiments, a case was described in which the execution screen showed that the execution of a lottery game or restoration processing was given benefit according to the acquisition time when the currency item to be consumed was acquired, but may instead show the acquisition time of a currency item scheduled to be consumed, or that benefit will be given according to this acquisition time (such as the amount of increase in the lottery draw probability, or the restoration amount of the current stamina value). Also, a screen other than the execution screen (such as a screen showing currency items possessed by the player) may be provided that lists the acquisition times of each of the currency items possessed by the player.

Also, in the first and second embodiments, a case was described in which the control unit 54 gave benefit in the execution of a lottery game or restoration processing according to the acquisition time of the consumed currency item, but benefit may instead be given to each game type in which currency items can be consumed (such as continuing a quest, increasing the upper limit of characters possessed, increasing the upper limit of friends, etc.). For example, in the continuation of a quest, the control unit 54 may give benefit in increasing the capability parameters of organized characters (such as hit points, attack power, defense power, etc.) more than usual. Also, for example, when increasing the upper limit of characters possessed or the upper limit of friends, the control unit 54 may give benefit in increasing the upper limit number more than usual.

Also, the control unit 54 may make the value of a first currency item whose acquisition time is after a specific time be different from the value of a second currency item whose acquisition time is before the specific time. More specifically, the control unit 54 may treat the value of the first currency item as being twice the value of the second currency item. Similarly, the control unit 54 may treat the value of the second currency item as being twice the value of the first currency item.

Also, in the first and second embodiments, a case was described in which the stamina restoration amount of the stamina information in the player information 50A was 10, for example, but it may instead be a value corresponding to the stamina upper limit value. Examples of the value corresponding to the stamina upper limit include the same number as the stamina upper limit, and half the stamina upper limit.

Also, the stamina restoration amount may be a fixed value that is the same for each player. That is, the stamina restoration amount may not increase with the rank of the player.

Also, in the first embodiment and the second embodiment, a case was mainly described in which the content was characters, but the content may instead be various items such as weapons or armor, or cards, avatars, coins, points, etc.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage unit, 52 . . . consumption unit, 54 . . . control unit

What is claimed is:

1. A non-transitory computer readable recording medium storing instructions executable by an information processing device that communicates with a terminal device comprising a display via a network, the instructions causing the information processing device to execute:

causing the terminal device to execute a lottery game in which a player consumes currency items and obtains a content drawn from a lottery target content group;

causing the terminal device to display, on a display, an execution screen indicating benefit in execution of the lottery game;

storing, in a storage, player information and an acquisition time at which the player acquired each of the currency items;

based on the acquisition time of the currency items, causing the terminal device to modify the execution screen to update the benefit in the execution of the lottery game;

reducing a number of the currency items possessed by the player such that the currency items are consumed in order of the acquisition time from a least recent time or a most recent time in response to a request to execute the lottery game; and updating the player information to reflect the benefit after the updating during the lottery game.

2. The non-transitory computer readable recording medium according to claim 1, wherein the instructions cause the information processing device to further execute:

giving the benefit when the acquisition time is a specific time or after the specific time.

3. The non-transitory computer readable recording medium according to claim 2, wherein the instructions cause the information processing device to further execute:

giving more benefit in the execution of the lottery game the more recent the acquisition time is.

4. The non-transitory computer readable recording medium according to claim 1, wherein the instructions cause the information processing device to further execute:

giving the benefit when the acquisition time is before a specific time.

5. The non-transitory computer readable recording medium according to claim 4, wherein the instructions cause the information processing device to further execute:

giving more benefit in the execution of the lottery game the less recent the acquisition time is.

6. The non-transitory computer readable recording medium according to claim 2, wherein the instructions cause the information processing device to further execute:

giving the benefit based on statistical information on acquisition times of the currency items.

7. The non-transitory computer readable recording medium according to claim 2, wherein the instructions cause the information processing device to further execute:

giving the benefit by increasing a lottery draw probability of a specific content that has a higher rarity than a predetermined threshold and is included in the lottery target content group.

8. The non-transitory computer readable recording medium according to claim 2, wherein the instructions cause the information processing device to further execute:

giving the benefit by adding, to the lottery target content group, a specific content that has a higher rarity than a predetermined threshold.

9. The non-transitory computer readable recording medium according to claim 7, wherein the specific content is a content newly added through a game update after the specific time.

10. The non-transitory computer readable recording medium according to claim 1, wherein the currency items include a paid item that can be acquired through a purchase procedure, and a free item that can be acquired through game execution.

11. An information processing device that communicates with a terminal device comprising a display via a network, the information processing device comprising:

a storage; and a control device that:

causes the terminal device to execute a lottery game in which a player consumes currency items and obtains a content drawn from a lottery target content group, causes the terminal device to display, on a display, an execution screen indicating benefit in execution of the lottery game, storing, in the storage, an acquisition time at which the player acquired each of the currency items, based on the acquisition time of the currency items, causing the terminal device to modify the execution screen to update the benefit in the execution of the lottery game, reducing a number of the currency items possessed by the player such that the currency items are consumed in order of the acquisition time from a least recent time or a most recent time in response to a request to execute the lottery game, and updating the player information to reflect the benefit after the updating during the lottery game.

12. The non-transitory computer readable recording medium according to claim 1, wherein the execution screen is a lottery game execution screen that includes an execute button concurrently receiving the request to execute the lottery game and selection of a number of lottery draw, and the instructions cause the information processing device to further execute:

upon operation of the execute button, consuming the currency items depending on the number of lottery draw.

* * * * *